United States Patent
Chou et al.

(10) Patent No.: US 7,480,811 B2
(45) Date of Patent: Jan. 20, 2009

(54) POWER SUPPLY SYSTEM FOR PERSONAL COMPUTERS

(75) Inventors: Ching-Ling Chou, Taipei Hsien (TW);
Michael Chen, Taipei Hsien (TW);
Chin-Szu Lee, Taipei Hsien (TW)

(73) Assignee: Topower Computer Industrial Co., Ltd., Xindian (TW)

( * ) Notice: Subject to any disclaimer, the term of this patent is extended or adjusted under 35 U.S.C. 154(b) by 404 days.

(21) Appl. No.: 11/304,899

(22) Filed: Dec. 16, 2005

(65) Prior Publication Data

US 2007/0143634 A1    Jun. 21, 2007

(51) Int. Cl.
*G06F 1/26* (2006.01)

(52) U.S. Cl. .................. 713/300; 713/310; 713/320; 713/321; 713/322; 713/323; 713/324; 713/330; 713/340

(58) Field of Classification Search .............. 713/300, 713/310, 320–324, 330, 340
See application file for complete search history.

(56) References Cited

U.S. PATENT DOCUMENTS

| | | | | |
|---|---|---|---|---|
| 4,886,979 A | * | 12/1989 | Chang | 307/11 |
| 6,564,333 B1 | * | 5/2003 | Ho et al. | 713/340 |
| 7,301,313 B1 | * | 11/2007 | Hart et al. | 323/269 |
| 2007/0124606 A1 | * | 5/2007 | Hsieh | 713/300 |
| 2007/0136613 A1 | * | 6/2007 | Chen | 713/300 |

* cited by examiner

*Primary Examiner*—Abdelmoniem Elamin
(74) *Attorney, Agent, or Firm*—Apex Juris, pllc; Tracy M. Heims

(57) ABSTRACT

A power supply system for personal computers aims to provide an additional sub-power supply needed when a personal computer requires a power greater than what can be provided by the original main power supply. This invention provides a sub-power supply in the spare space of the existing chassis of the personal computer without removing the main power supply to augment the power supply. The starting power of the sub-power supply is provided by the main power supply. Hence when the personal computer is in the machine stop condition, only the main power supply consumes electric power. Thereby this invention can preserve a green power.

14 Claims, 3 Drawing Sheets

POWER SUPPLY SYSTEM FOR PERSONAL COMPUTERS

FIELD OF THE INVENTION

The present invention relates to a power supply system for personal computers and particularly to a power supply system that increases the power needed by personal computers by adding an extra power supply device.

BACKGROUND OF THE INVENTION

With rapid advance of multimedia and Internet technologies, the power required by personal computers also increases significantly, especially for CPU, motherboard and graphic adapter card. For users who frequently play online games, the operation power of the personal computer has to be more than 600 W to meet requirements. Once the equipment of the personal computer is upgraded, the original power supply also has to be upgraded. Namely, the original power supply with insufficient power has to be replaced and discarded. However, in terms of the power supply specification, even if the upgraded speed of the personal computer is faster, the power specification and the size and installation location of the power supply on the personal computer are still compatible. To throw away the power supply merely because of insufficient power is a waste of resources. Moreover, recycling of the power supply is quite difficult. It also creates environmental pollution problem.

In industrial computers, using multiple sets of power supply to provide power is a common practice. In practice, the usual approach includes a backup power supply. For instance, for a power supply of 500 W that includes two sets configured in a 1+1 fashion, with the actual power requirement of 500 W, each of the two sets of power supply provides 250 W. As the industrial computer mainly aims to function as a server and must be maintained in an operating condition constantly, if one set of the power supply is damaged, another set has to be enhanced to support the maximum load and still maintain the normal operating condition. But for personal computers, they are not normally being maintained in the operating condition. If multiple sets of power supply are procured, there is no extra space for installation. Moreover, most personal computers have machine stop time longer than operation time. At present the concept of green environmental protection is widely aware, reducing power consumption at machine stop time is an important issue to be addressed. The existing design model of the industrial computer cannot be directly transferred to the personal computer.

SUMMARY OF THE INVENTION

The primary object of the present invention is to solve the aforesaid disadvantages. The present invention provides a power supply system that does not have to remove the original main power supply of a personal computer when power requirement is greater than the capacity of original main power supply. A sub-power supply is added and installed on the spare space of the personal computer chassis. Moreover, the starting power of the sub-power supply is provided by the main power supply. Hence when the personal computer is in the machine stop condition, power consumption takes place only in the main power supply. Thereby a green power can be preserved.

In order to achieve the foregoing object, the invention provides at least one sub-power supply located on a chassis of a side panel of a personal computer. The sub-power supply has an input end connecting to city power and an output end to supply DC power. Moreover, the sub-power supply has a sub-power system to transform power to become operation power of the personal computer. The starting power of the sub-power system is driven by at least one output DC power provided by the output end of the main power supply. Hence the sub-power supply can complement the power of the main power supply to provide sufficient power for the personal computer.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
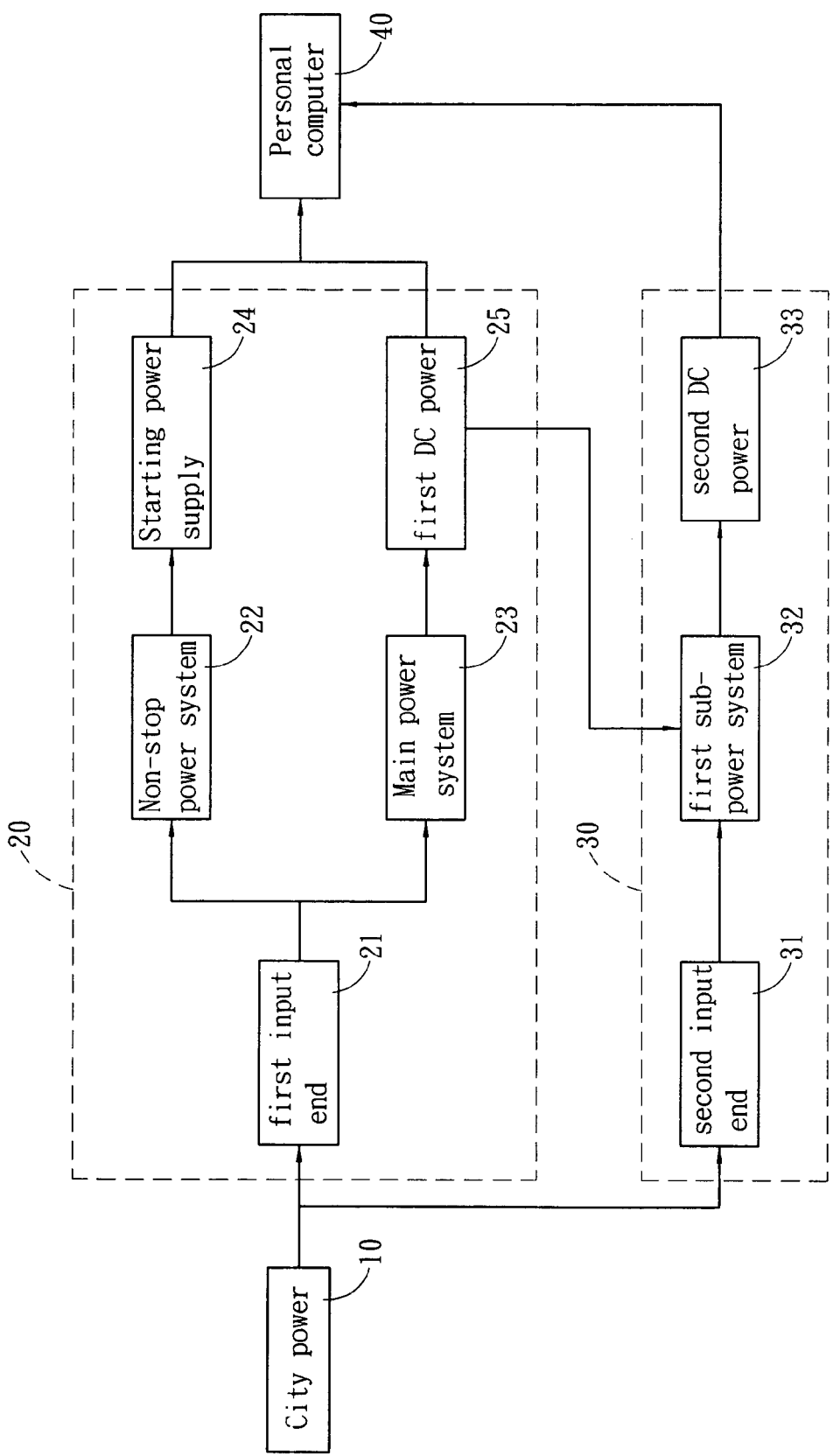
FIG. 1 is a circuit block diagram of a first embodiment of the present invention.
Figure 2:
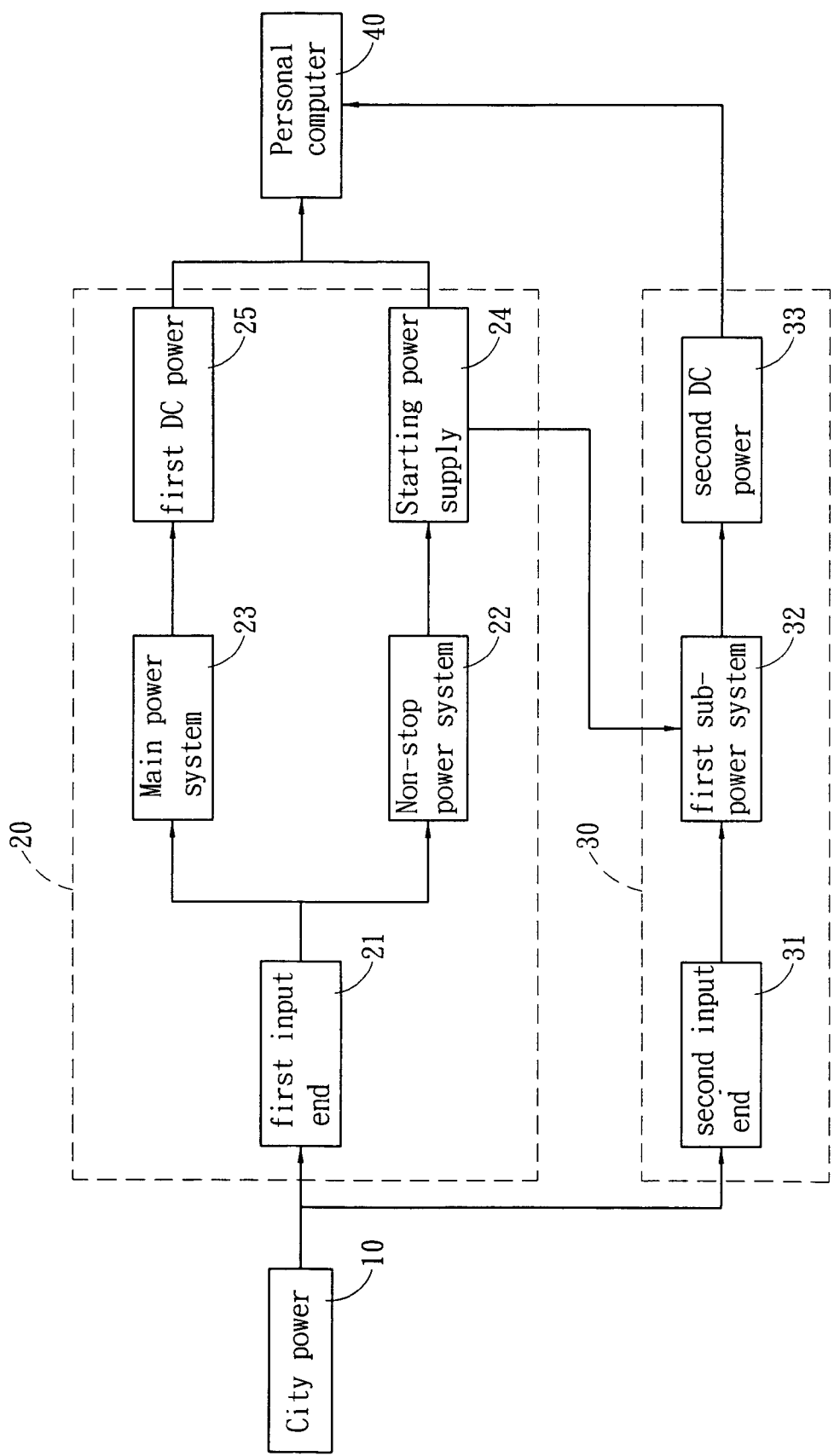
FIG. 2 is a circuit block diagram of a second embodiment of the present invention.

Please refer to FIG. 1 for the circuit block diagram of a first embodiment of the present invention. It is a power supply system for a personal computer 40 to transform a city power 10 to become DC power 25 and 33 of different potentials for operation of the personal computer 40. It mainly includes a main power supply 20 located in the personal computer 40. The main power supply 20 includes a main power system 23 to perform power transformation for the operation of the personal computer 40 and a non-stop power system 22 to provide a starting power supply 24 in normal conditions for the personal computer 40. The main power supply 20 has a first input end 21 connecting to the city power 10 and a first output end to output first DC power 25. The power supply system also includes a first sub-power supply 30 which is located on a chassis of a side panel of the personal computer 40. The first sub-power supply 30 has a second input end 31 connecting to the city power 10 and a second output end to output second DC power 33. The first sub-power supply 30 includes a first sub-power system 32 to perform power transformation for the operation of the personal computer 40. The starting power of the first sub-power system 32 is driven by at least one first output DC power 25 supplied by the first output end of the main power supply 20. Hence after the main power supply 20 has been started and output the first DC power 25, the first sub-power supply 30 is started. Or as shown in FIG. 2, the starting power of the first sub-power supply system 32 is driven by the starting power supply 24 of the non-stop power system 22 of the main power supply 20. Hence after the personal computer 40 is started, the main power supply 20 and the first sub-power supply 30 are started at the same time to perform power transformation.

The potentials of the DC power 25 and 33 required by the personal computer 40 generally are 5V, 3.3V, 12V and STB5V. The present design specifications of the main power supply 20 generally simultaneously are made to output multiple sets of the first DC power 25 and starting power supply 24 of different potentials. Hence the first sub-power supply 30 can also output multiple sets of the second DC power 33 of different potentials or a single potential. In the event that the first sub-power supply 30 aims to complement the power of the existing main power supply 20, selection of multiple sets of different potentials or single potential for the first sub-power supply 30 depends on the requirements of the additional peripheral devices or upgrade of the personal computer 40. For assembly, the first sub-power supply 30 is installed on a preset chassis insertion slot on a front face panel of the existing personal computer 40. The commonly adopted specification is 5.25 in or 3.5 in. The starting power of the first sub-power supply 30 is provided by the first DC power 25 output from the main power supply 20 or the starting power supply 24 connecting to the first sub-power supply 30. When the personal computer 40 is started, as the first and second input ends 21 and 31 of the main power supply 20 and the first sub-power supply 30 are connected to the city power 10, the main power supply 20 and the first sub-power supply 30 transform the power respectively to DC power 25 and 33, and provide to the personal computer 40.

From the perspective of power supply producers, a new power supply specification can be made based on the invention, namely the main power supply 20 outputs the first DC power 25 of a single potential, while the first sub-power supply 30 can output multiple sets of second DC power 33 at a single potential or different potentials. Therefore it can be adapted to meet different power requirements of varying peripheral devices. It also provides a guarding design to prevent mistaken coupling resulting from same power connector specifications.

Figure 3:
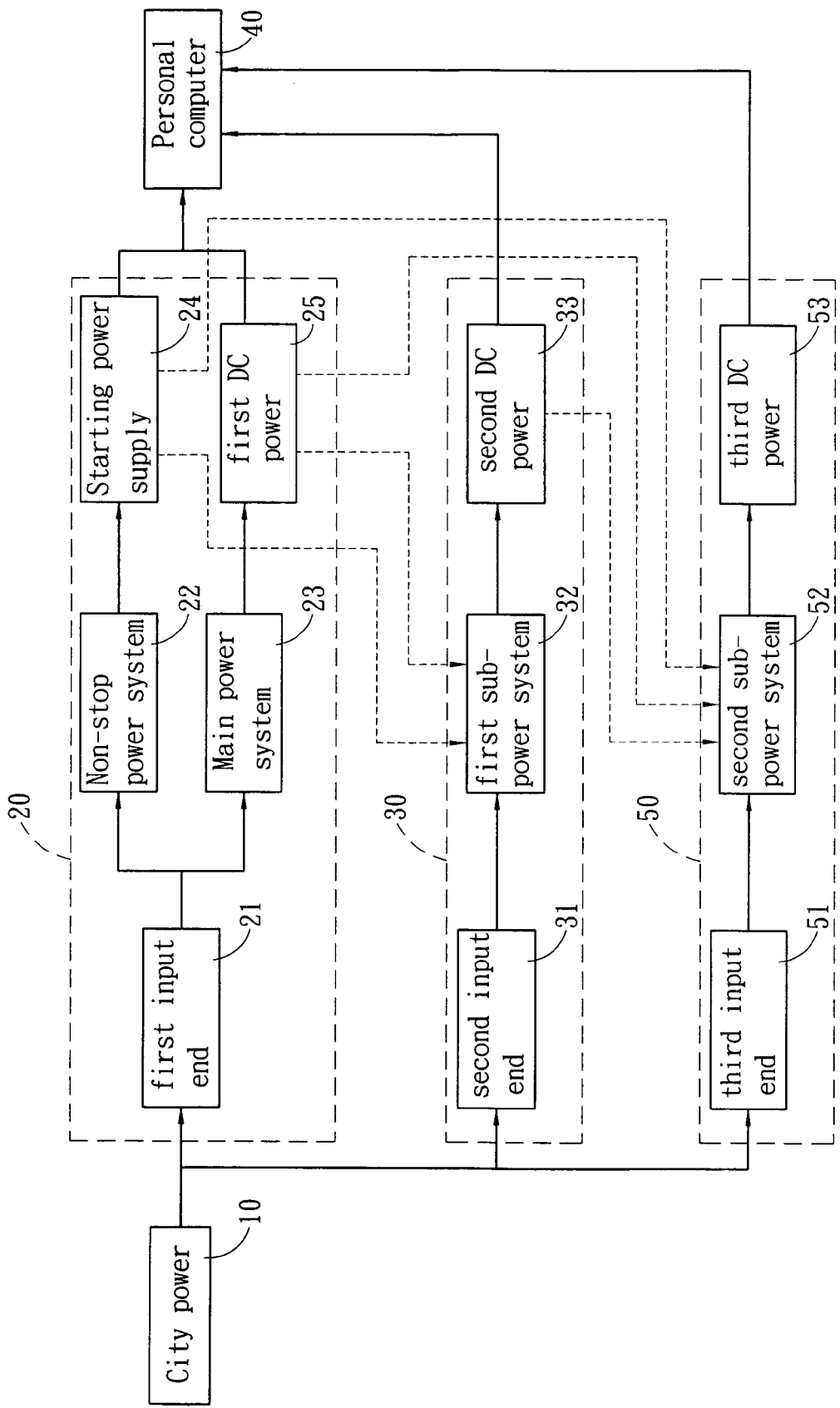
FIG. 3 is a circuit block diagram of a third embodiment of the present invention.

Refer to FIG. 3 for another embodiment of the invention in which a second sub-power supply 50 is provided. The second sub-power supply 50 has a third input end 51 connecting to the city power 10, a second sub-power system 52 to perform power transformation and a transformed third DC power 53 to be output. Installation and operation of the second sub-power supply 50 are same as those previously discussed. Moreover, the starting power of the second sub-power supply 50 may be driven by at least one output first DC power 25 from the output end of the main power supply 20, or the starting power supply 24 of the non-stop power system 22 of the main power supply 20, or at least one output second DC power 33 from the output end of the first sub-power supply 30. Whatever combination being adopted, when the personal computer 40 is in the machine stop condition, only the power of the non-stop power system 22 in the main power supply 20 is consumed. The sub-power supplies 30 and 50 contain only sub-power systems 32 and 52 for power transformation, hence do not consume electric power. The power supply of the invention adopts a power expansion mode same as capacity expansion of the existing hard disk drives. When the personal computer 40 is upgraded, the existing main power supply 20 can be retained without being discarded. Thus it not only can save upgrade cost, also provide the benefits of environmental protection.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power supply system for personal computers to transform city power to multiple DC power of different potentials to be used for operation of a personal computer, comprising:
   a main power supply which is located in the personal computer and has a main power system to perform power transformation for the operation of the personal computer and a non-stop power system to provide a starting power supply in normal conditions to the personal computer, the main power supply having a first input end connecting to the city power and a first output end to output first DC power; and
   a first sub-power supply which is located on a chassis of a side panel of the personal computer and has a second input end connecting to the city power and a second output end to output second DC power, the first sub-power supply having a first sub-power system to perform power transformation for the operation of the personal computer, the first sub-power system being driven by a starting power which is provided by at least one output first DC power from the first output end of the main power supply, the main power supply being started to output the first DC power then to start the first sub-power supply.

2. The power supply system for personal computers of claim 1, wherein the main power supply outputs the first DC power at a single potential and the first sub-power supply outputs multiple sets of the second DC power at different potentials.

3. The power supply system for personal computers of claim 1, wherein the main power supply outputs the first DC power at a single potential and the first sub-power supply includes multiple sets each outputs one set of the second DC power at a different potential.

4. The power supply system for personal computers of claim 1, wherein the main power supply outputs the first DC power at multiple potentials and the first sub-power supply outputs multiple sets of the second DC power at different potentials.

5. The power supply system for personal computers of claim 1, wherein the main power supply outputs the first DC power at multiple potentials and the first sub-power supply outputs the second DC power at a single potential.

6. The power supply system for personal computers of claim 1 further having a second sub-power supply whose starting power is driven by at least one output first DC power from the first output end of the main power supply.

7. The power supply system for personal computers of claim 1 further having a second sub-power supply whose starting power is driven by at least one output second DC power from the second output end of the first sub-power supply.

8. A power supply system for personal computers to transform city power to multiple DC power of different potentials to be used for operation of a personal computer, comprising:
   a main power supply which is located in the personal computer and has a main power system to perform power transformation for the operation of the personal computer and a non-stop power system to provide a starting power supply in normal conditions to the personal computer, the main power supply having a first input end connecting to the city power and a first output end to output first DC power; and
   a first sub-power supply which is located on a chassis of a side panel of the personal computer and has a second input end connecting to the city power and a second output end to output second DC power, the sub-power supply having a first sub-power system to perform power transformation for the operation of the personal computer, the first sub-power system being driven by a starting power supplied by the starting power supply of the non-stop power system of the main power supply such that the main power supply and the first sub-power supply simultaneously start the power transformation after the personal computer is started.

9. The power supply system for personal computers of claim 8, wherein the main power supply outputs the first DC power at a single potential and the first sub-power supply outputs multiple sets of the second DC power at different potentials.

10. The power supply system for personal computers of claim 8, wherein the main power supply outputs the first DC power at a single potential and the first sub-power supply including multiple sets each outputs one set of the second DC power at a different potential.

11. The power supply system for personal computers of claim 8, wherein the main power supply outputs the first DC power at multiple potentials and the sub-power supply outputs multiple sets of the second DC power at different potentials.

12. The power supply system for personal computers of claim 8, wherein the main power supply outputs the first DC power at multiple potentials and the sub-power supply outputs the second DC power at a single potential.

13. The power supply system for personal computers of claim 8 further having a second sub-power supply whose starting power is driven by the starting power supply of the non-stop power system of the main power supply.

14. The power supply system for personal computers of claim 8 further having a second sub-power supply whose starting power is driven by at least one output second DC power from the second output end of the first sub-power supply.

* * * * *